(12) United States Patent
Dodman

(10) Patent No.: US 8,820,291 B2
(45) Date of Patent: Sep. 2, 2014

(54) CONNECTING ROD WITH OFFSET CAP HOLES FOR INTERNAL COMBUSTION ENGINE

(75) Inventor: Benjamin Dodman, Northamptonshire (GB)

(73) Assignee: Cummins Intellectual Property, Inc., Minneapolis, MN (US)

( * ) Notice: Subject to any disclaimer, the term of this patent is extended or adjusted under 35 U.S.C. 154(b) by 309 days.

(21) Appl. No.: 13/416,788

(22) Filed: Mar. 9, 2012

(65) Prior Publication Data

US 2012/0227538 A1    Sep. 13, 2012

Related U.S. Application Data

(60) Provisional application No. 61/450,890, filed on Mar. 9, 2011.

(51) Int. Cl.
    *G05G 1/00*          (2008.04)
(52) U.S. Cl.
    USPC ....................................................... 123/197.3
(58) Field of Classification Search
    USPC ..................................... 123/197.3; 74/579 E
    IPC ............................................. F16C 7/027,9/04
    See application file for complete search history.

(56) References Cited

U.S. PATENT DOCUMENTS

| | | | |
|---|---|---|---|
| 4,114,961 A | 9/1978 | Pithie | |
| 4,833,939 A * | 5/1989 | Beckmann et al. | 74/579 E |
| 4,836,043 A | 6/1989 | Morris et al. | |
| 6,178,849 B1 | 1/2001 | Matthews | |
| 6,598,468 B2 | 7/2003 | Zur Loye et al. | |
| 6,609,299 B2 | 8/2003 | Adachi | |
| 6,767,132 B2 | 7/2004 | Vicars | |
| 6,840,218 B2 | 1/2005 | Scholl et al. | |
| 7,255,090 B2 | 8/2007 | Fader et al. | |
| 7,319,930 B2 | 1/2008 | Dietl et al. | |
| 7,401,504 B2 | 7/2008 | Sunwoo et al. | |
| 2005/0051136 A1 | 3/2005 | Malaczynski et al. | |
| 2009/0295397 A1 | 12/2009 | Barsukov | |
| 2009/0301435 A1 | 12/2009 | Weissenborn et al. | |
| 2010/0121588 A1 | 5/2010 | Elder et al. | |
| 2010/0242896 A1 | 9/2010 | Knudsen et al. | |

FOREIGN PATENT DOCUMENTS

| | | |
|---|---|---|
| FR | 2 012 529 A | 3/1970 |
| GB | 2331153 | 12/1999 |
| JP | S59-131018 A | 7/1984 |
| WO | 2004106946 | 12/2004 |
| WO | 2007053250 | 5/2007 |
| WO | 2010024892 | 3/2010 |

OTHER PUBLICATIONS

International Search Report and the Written Opinion of the International Searching Authority dated Jun. 12, 2012; International Application No. PCT/US2012/028556.

* cited by examiner

*Primary Examiner* — M. McMahon
(74) *Attorney, Agent, or Firm* — Faegre Baker Daniels LLP

(57) ABSTRACT

A connecting rod including a connecting rod body and a cap attached to the connecting rod body by a plurality of bolts. The connecting rod body includes a shank having a centerline. Two of the bolts are positioned at a first distance from the centerline and two of the bolts are positioned at a second distance from the centerline that is greater than the first distance. The plurality of bolts may be disposed symmetrically about a centroid of a planar face of the connecting rod.

8 Claims, 4 Drawing Sheets

CONNECTING ROD WITH OFFSET CAP HOLES FOR INTERNAL COMBUSTION ENGINE

CROSS-REFERENCE TO RELATED APPLICATIONS

This application claims the benefit of priority to U.S. Provisional Patent Application No. 61/450,890, filed on Mar. 9, 2011, which is hereby incorporated by reference in its entirety.

TECHNICAL FIELD

This disclosure relates to connecting rods for internal combustion engines and a configuration for attaching a cap portion of the connecting rod to the connecting rod.

BACKGROUND

A connecting rod, also called a conrod, provides a link between a piston and an engine crankshaft in an internal combustion engine. The connecting rod of an engine is subject to tremendous stress from an associated piston during the combustion cycle as well as stresses from a drive train when an engine absorbs energy from overdriven wheels. These stresses can cause failure of a connecting rod, which causes catastrophic failure of an associated engine.

Connecting rods are attached to a piston at one end and to a crankshaft at an opposite end. At the crankshaft end, the connecting rod typically has a cap portion that is attached to the main body of the connecting rod by a plurality of bolts. The stress transmitted through the connecting rod alternatively causes stretching and relaxation of the bolts holding the cap portion to the main body, which can cause a loosening of the clamp load on the crankshaft, leading to failure of the connecting rod. Improving the consistency of clamp load, particularly the loading on contact surfaces between the cap portion and the main body portion, can improve the life of a connecting rod, which can then increase the life and reliability of an associated internal combustion engine.

SUMMARY

This disclosure provides a connecting rod for an internal combustion engine. The connecting rod comprises a first end, a second end, and a shank. The second end includes a thrust face, a non-thrust face, a first planar surface, a second planar surface, and a centroid. The non-thrust face is parallel with the thrust face and is positioned a spaced distance from the thrust face. The first planar surface includes a first pair of bolt holes located therein. The second planar surface includes a second pair of bolt holes located therein. The first planar surface and the second planar surface are positioned perpendicular to the thrust face and the non-thrust face. The centroid is positioned along the first planar surface and the second planar surface transversely equidistant from a central axis of each of the first pair of bolt holes and from each of the second pair of bolt holes. The shank connects the first end to the second end and includes a centerline extending parallel to, and positioned an offset distance from, the centroid.

This disclosure also provides a connecting rod for an internal combustion engine, comprising a first end, a second end, and a shank. The second end includes a thrust face, a non-thrust face, a first planar surface, and a second planar surface. The non-thrust face is parallel with the thrust face and is positioned a spaced distance from the thrust face. The first planar surface includes a first pair of bolt holes located therein. The second planar surface includes a second pair of bolt holes located therein. Each bolt hole of the first and second pairs of bolt holes includes a central axis. The shank connects the first end to the second end and includes a centerline. One bolt hole of each of the first and the second pairs of bolt holes is positioned a first hole distance from the shank centerline and another bolt hole of each of the first and second pairs of bolt holes is positioned a second hole distance from the shank centerline. The first hole distance is greater than the second hole distance.

Advantages and features of the embodiments of this disclosure will become more apparent from the following detailed description of exemplary embodiments when viewed in conjunction with the accompanying drawings.

DETAILED DESCRIPTION

Connecting rods may include an array of elements, described in more detail hereinbelow. Two of the principal components may be a connecting rod body and a cap portion that connects to the connecting rod body. The cap portion, in conjunction with features located on the connecting rod body, secures a connecting rod to a rod journal of a crankshaft of an internal combustion engine. The connecting rod cap or cap portion is attached to the connecting rod body along a joint or joining interface by a plurality of bolts.

Figure 1:
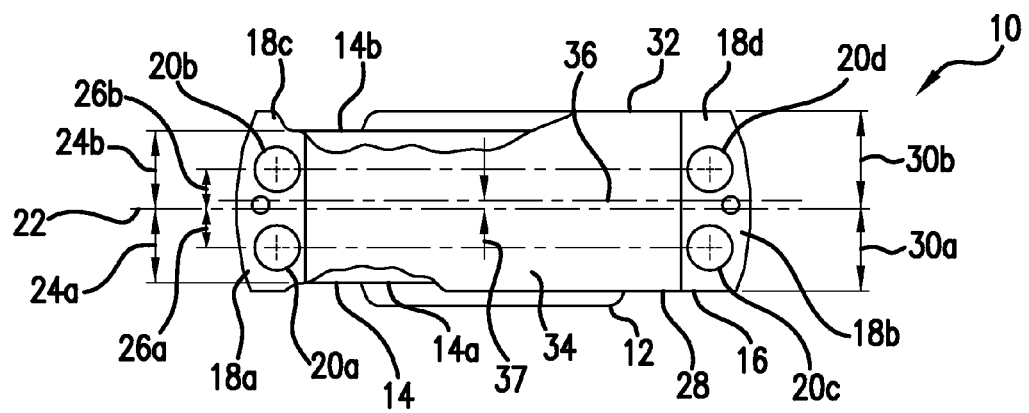
FIG. 1 is a plan view of a first conventional connecting rod body with part of a second end portion cut away.

Referring now to FIG. 1, a conventional connecting rod body 10 includes a first end portion 12, a second end portion 16, and a shank portion 14 that connects first end portion 12 to second end portion 16. Second end portion 16 includes a first planar surface 18a and a second planar surface 18b. For ease of manufacture, first planar surface 18a and second planar surface 18b are typically coplanar. Second end portion 16 also includes a first pair of bolt holes 20a and 20b that extend generally perpendicularly to first planar surface 18a into second end portion 16 and a second pair of bolt holes 20c and 20d that extend generally perpendicularly to second planar surface 18b into second end portion 16.

Shank portion 14 includes a centerline 22 that extends the length of shank portion 14, a first side 14a and a second side 14b. First side 14a is located a first transverse distance 24a from centerline 22 and second side 14b is located a second transverse distance 24b from centerline 22. First transverse distance 24a is equal to second transverse distance 24b. Bolt hole 20a and bolt hole 20c are positioned a third transverse distance 26a from centerline 22 and bolt hole 20b and bolt hole 20d are positioned a fourth transverse distance 26b from centerline 22. Third transverse distance 26a and fourth transverse distance 26b are equal within the capability of manufacturing processes to position bolt holes 20a, 20b, 20c and 20d. Connecting rod body 10 includes a longitudinally extending thrust face 28 positioned a fifth transverse distance 30a from centerline 22 and a non-thrust face 32 that is generally parallel to thrust face 28 and is positioned a sixth transverse distance 30b from centerline 22 in a direction opposite from thrust face 28.

Second end portion 16 includes a curvilinear bearing face 34 that mates with an associated crankshaft in an engine. When connecting rod body 10 is positioned in a "V"-type engine so that curvilinear bearing face 34 mates with a rod journal or bearing surface on an associated crankshaft (not shown), thrust face 28 is positioned adjacent to a thrust face of another connecting rod. Sixth transverse distance 30b is greater than fifth transverse distance 30a because of the configuration of an associated crankshaft (not shown) and the bearing surface required for interfacing connecting rod body 10 with a crankshaft.

First planar surface 18a and second planar surface 18b, which represent contact areas for an associated cap portion (not shown), also includes a centroid 36 that is parallel to and offset from centerline 22 of shank portion 14 by a spaced distance 37. Centroid 36 may coincide with the centerline of second end portion 16 if first planar surface 18a and second planar surface 18b are symmetric about the centerline of first planar surface 18a and second planar surface 18b. The reason centroid 36 is offset from centerline 22 of shank portion 14 is that second end portion 16 is not disposed symmetrically in a transverse direction about shank portion 14.

While conventional connecting rod body 10 works for its intended purpose, connecting rod failures continue to occur. Applicant determined that during certain operating conditions of an associated internal combustion engine, such as a maximum over-speed condition, the cap portion separates from connecting rod body 10 in a portion 18c of first planar surface 18a and in a portion 18d of second planar surface 18b. This separation can lead to stress on first planar surface 18a and second planar surface 18b that results in yielding of these surfaces and potentially excessive stretch of the bolts that attach a cap portion to connecting rod body 10, which eventually leads to failure of the connection rod of which connecting rod body 10 is a part.

Figure 2:
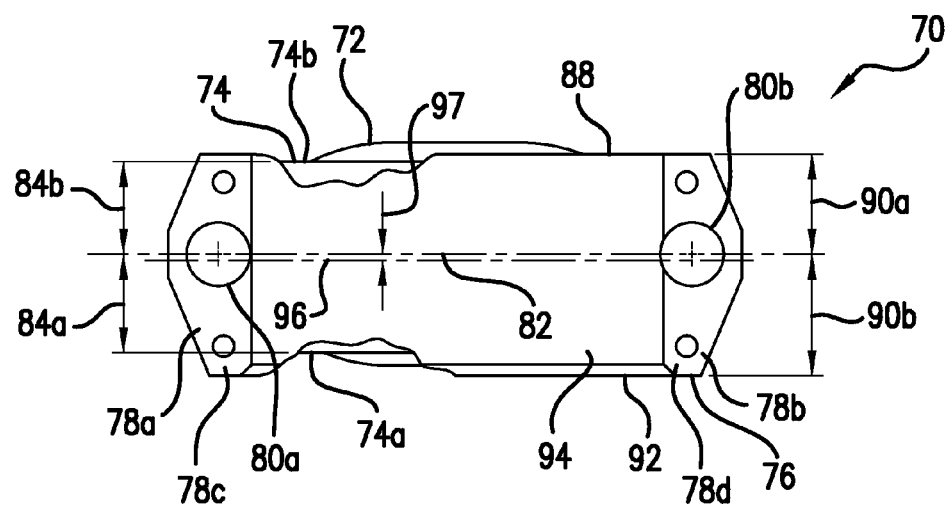
FIG. 2 is a plan view of a third conventional connecting rod body with part of a second end portion cut away.
Figure 3:
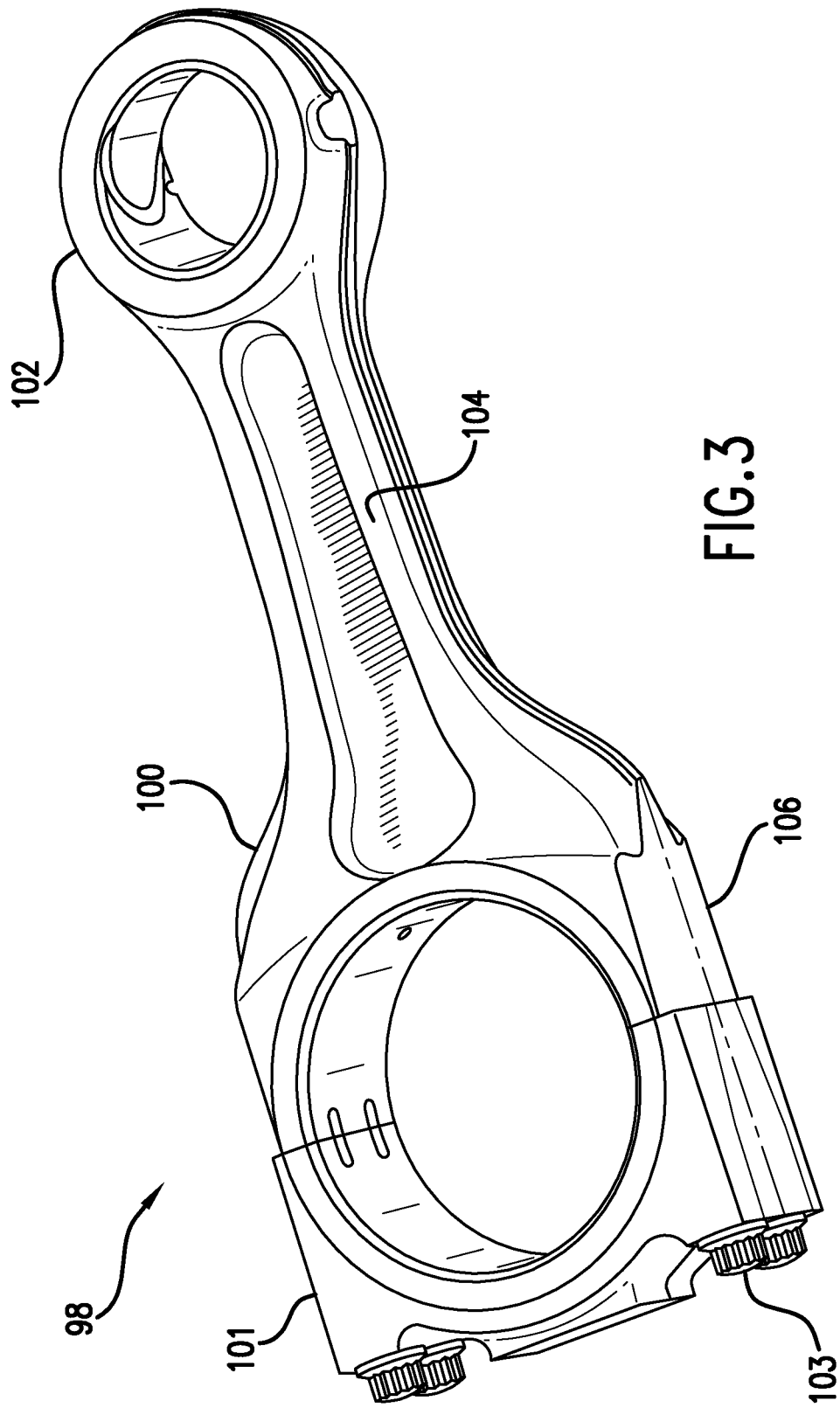
FIG. 3 is a perspective view of a connecting rod in accordance with an exemplary embodiment of the present disclosure.
Figure 4:
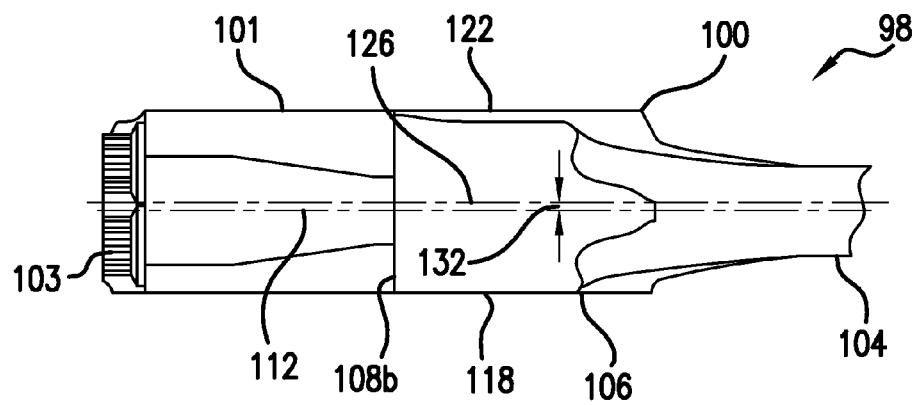
FIG. 4 is an elevation view of the connecting rod of FIG. 3.
Figure 5:
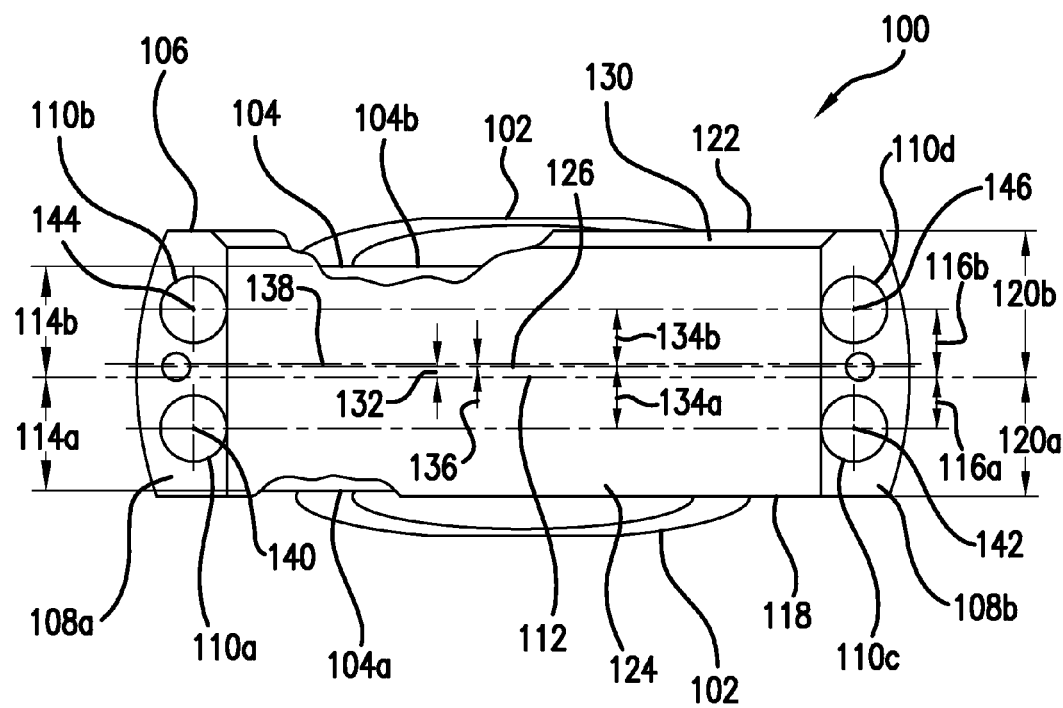
FIG. 5 is a plan view of a connecting rod body of FIG. 3 with part of a second end portion cut away.
Figure 6:
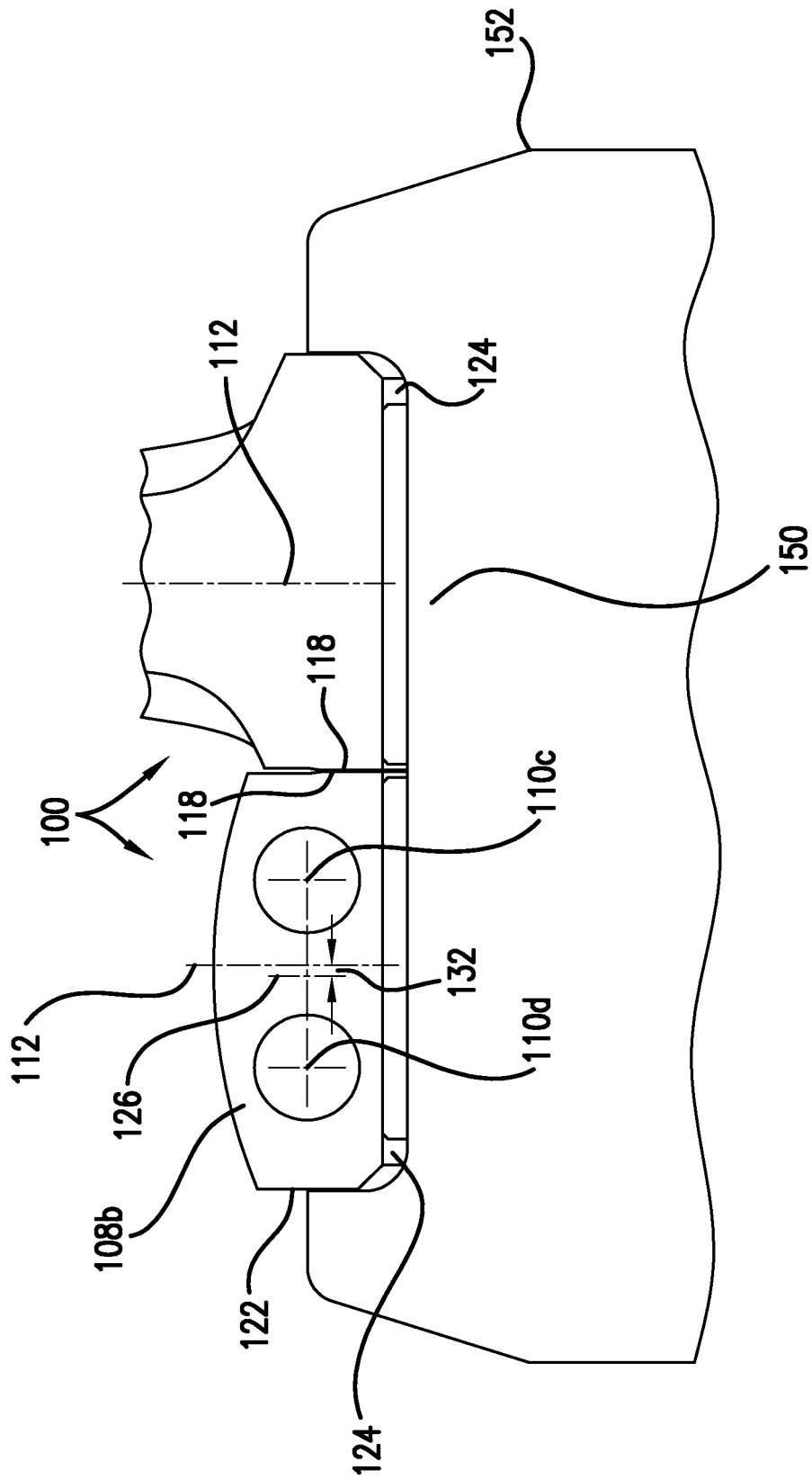
FIG. 6 is a schematic of two connecting rods in accordance with an exemplary embodiment of the present disclosure attached to a crankshaft.

Referring now to FIG. 2, a conventional connecting rod body 70 includes a first end portion 72, a second end portion 76, and a shank portion 74 that connects first end portion 72 to second end portion 76. Second end portion 76 includes a first planar surface 78a and a second planar surface 78b. For ease of manufacture, first planar surface 78a and second planar surface 78b are typically coplanar. Second end portion 76 also includes a first bolt hole 80a that extends generally perpendicularly to first planar surface 78a into second end portion 76 and a second bolt hole 80b that extends generally perpendicularly to second planar surface 78b into second end portion 76.

Shank portion 74 includes a centerline 82 that extends the length of shank portion 74, a first side 74a and a second side 74b. First side 74a is located a first transverse distance 84a from centerline 82 and second side 74b is located a second transverse distance 84b from centerline 82. First transverse distance 84a is equal to second transverse distance 84b. A first bolt hole 80a and a second bolt hole 80b are positioned along centerline 82. Connecting rod body 70 includes a longitudinally extending thrust face 88 positioned a third transverse distance 90a from centerline 82 and a non-thrust face 92 that is generally parallel to thrust face 88 and is positioned a fourth transverse distance 90b from centerline 82 in a direction opposite from thrust face 88.

Second end portion 76 includes a bearing face 94 that mates with an associated crankshaft in an engine. When connecting rod body 70 is positioned in a "V"-type engine so that bearing face 94 mates with a rod journal or bearing surface on an associated crankshaft (not shown), thrust face 88 is positioned adjacent to a thrust face of another connecting rod. Second transverse distance 90b is greater than first transverse distance 90a because of the configuration of an associated crankshaft (not shown) and the bearing surface required for interfacing connecting rod body 70 with a crankshaft.

First planar surface 78a and second planar surface 78b, which represent contact areas for an associated cap portion, also includes a centroid 96 that is parallel to and offset from centerline 82 of shank portion 74 by a spaced distance 97. Centroid 96 may coincide with the centerline of second end portion 76 if first planar surface 78a and second planar surface 78b are symmetric about the centerline of first planar surface 78a and second planar surface 78b. As with the previous embodiment, the reason centroid 96 is offset from centerline 82 of shank portion 74 is that second end portion 76 is not disposed symmetrically in a transverse direction about shank portion 74.

While conventional connecting rod body 70 works for its intended purpose, failures continue to occur. Applicant determined that during certain operating conditions of an associated internal combustion engine, such as a maximum over-speed condition, the cap portion separates from connecting rod body 70 in a portion 78c of first planar surface 78a and in a portion 78d of second planar surface 78b. This separation can lead to stress on first planar surface 78a and second planar surface 78b that results in yielding of these surfaces and potentially excessive stretch of the bolts that attach a cap portion to connecting rod body 70, which eventually leads to failure of the connection rod of which connecting rod body 70 is a part.

Referring now to FIGS. 3-6, a connecting rod assembly 98 in accordance with an exemplary embodiment of the present disclosure is shown. Connecting rod assembly 98 includes a connecting rod body 100 and a cap portion 101 attached to connecting rod body 100 by a plurality of bolts 103. Connecting rod body 100 includes a first end portion 102, a second end portion 106, and a shank portion 104 that connects first end portion 102 to second end portion 106. Second end portion 106 includes a first planar surface 108a and a second planar surface 108b that provides the contact areas for cap portion 101 when cap portion 101 is attached to connecting rod body 100. For ease of manufacture, first planar surface 108a and second planar surface 108b are typically coplanar. Second end portion 106 also includes a pair of bolt holes 110a and 110b that extend generally perpendicularly to first planar surface 108a into second end portion 106 and a pair of bolt holes 110c and 110d that extend generally perpendicularly to second planar surface 108b into second end portion 106.

Shank portion 104 includes a centerline 112 that extends the length of shank portion 104, a first side 104a and a second side 104b. First side 104a is located a first transverse distance 114a from centerline 112 and second side 104b is located a second transverse distance 114b from centerline 112. First transverse distance 114a is equal to second transverse distance 114b. A centerline or central axis 140 of bolt hole 110a and a centerline or central axis 142 of bolt hole 110c are positioned a third transverse distance 116a from centerline 112 and a centerline or central axis 144 of bolt hole 110b and a centerline or central axis 146 of bolt hole 110d are positioned a fourth transverse distance 116b from centerline 112. Fourth transverse distance 116b is greater than first transverse distance 116a, as will be described in more detail hereinbelow. Connecting rod body 100 includes a longitudinally extending thrust face 118 positioned a fifth transverse distance 120a from centerline 112 and a non-thrust face 122 that is generally parallel to thrust face 118 and is positioned a sixth transverse distance 120b from centerline 112 in a direction opposite from thrust face 118.

Second end portion 106 includes a bearing face 124 that mates with an associated crankshaft in an engine. When connecting rod assembly 98 is positioned in a "V"-type engine so that bearing face 124 mates with a rod journal or bearing surface 150 located on an associated crankshaft 152, thrust face 118 is positioned adjacent a thrust face of another connecting rod. Sixth transverse distance 120b is greater than fifth transverse distance 120a because of the configuration of associated crankshaft 152 and bearing surface 150 required for interfacing connecting rod assembly 98 with a crankshaft. Second end portion 106 may also include a chamfer 130 located on non-thrust face side 122.

First planar surface 108a and second planar surface 108b of second end portion 106 also includes a centroid 126 that is offset a first spaced distance 132 toward non-thrust face 122 from centerline 112 of shank portion 104. Because centroid 126 is geometrically determined based on the configuration of first planar surface 108a and second planar surface 108b, and first planar surface 108a and second planar surface 108b are not symmetric about a centerline 138 of second end portion 106, centroid 126 is also offset from centerline 138 of second end portion 106 by a spaced distance 136. Bolt holes 110a and 100c are located a distance 134a from centroid 126 and bolt holes 110b and 110d are located an equal distance 134b from centroid 126. The benefit to the exemplary embodiment of this disclosure is that the clamp load across first planar surface 108a and second planar surface 108b has an improved uniformity in comparison to conventional designs having the attachment bolts located along the centerline of the shank portion.

Bolt hole 110a and bolt hole 110b are symmetrically disposed in a transverse direction about centroid 126. Thus, bolt hole 110a and bolt hole 110b are in a relationship with each other and form a first bolt hole pattern. Similarly, bolt hole 110c and bolt hole 110d are symmetrically disposed in a transverse direction about centroid 126, forming a second bolt hole pattern. First planar surface 108a and second planar surface 108b have similar centroids because they are similar in shape. In another embodiment, the first planar surface may have a different shape than the second planar surface, in which case the centroid of the first planar surface would be different from the second planar surface. The effect of different centroids may be to transversely shift either the first bolt hole pattern or the second bolt hole pattern so that they no longer form the mirror image seen in FIG. 5.

Applicant appreciated that engines having cylinders arranged in a V-shape have connecting rods with an asymmetrical finished machined shape, as previously described and indicated by the difference in the distances between the centerline of the shank portion and the thrust face and the centerline of the shank portion and the non-thrust face. However, this conventional configuration has been used repeatedly with an acceptable failure rate. Applicant reviewed this configuration with the goal of determining whether a different bolt hole configuration or pattern for attaching the cap of a connecting rod to the connecting rod would yield improvements in uniformity of clamp stress between the cap portion and the connecting rod body, potentially decreasing the failure rate and improving reliability of connecting rods. Applicant discovered during development of alternative configurations that clamp loading in conventional connecting rods, specifically in areas or portions 18c and 18d in FIGS. 1, and 78c and 78d in FIG. 2, was insufficient to maintain attachment of a cap portion to a connecting rod body during certain operating conditions, for example a maximum overspeed condition. Because of the insufficient clamp load, separation was occurring on the facing surface of a cap portion and a connecting rod body in the aforementioned areas 18c, 18d, 78c and 78d. Applicant recognized that undesirable separation may be due to loss of clamp load in these outer regions and that the bolts that attach the cap portion to the connecting rod body may be amenable to an improved location. Applicant also recognized that merely tightening the cap bolts by an additional amount did not resolve the problem of clamp load, which analysis confirmed. The position of the bolt holes in conventional designs leads to non-uniformity of clamp loads regardless of the amount the cap bolts are tightened.

Following review of conventional configurations and historical separation issues, Applicant recognized a better positioning of bolt holes and bolts to a centralised position/location on the joint face, rather than the previous position centralized on the rod centerline. Applicant determined centroid 126 of first planar surface 108a and second planar surface 108b as described hereinabove. Each bolt hole, and thus each cap bolt, is positioned at the same transverse distance from centroid 126. Because each bolt hole is positioned at the same transverse distance from centroid 126, which is offset from centerline 112 by spaced distance 132, the bolt holes are positioned asymmetrically about centerline 112 of shank portion 104. Centerline 112 is also a split line for the forging process used to produce connecting rod body 100. The asymmetric position of bolt hole 110a and bolt hole 110c as compared to bolt hole 110b and bolt hole 110d stopped the joint separation issue, giving a comfortable ESW pass.

Applicant determined that offset distance 132 might be approximately 2.7 millimeters for the above-described configuration, or approximately 3.6% of the full width of second portion 106. However, distance 132 will depend on the configuration of second end portion 106 and may be larger or smaller than 2.7 millimeters. Applicant also discovered that the repositioning of the bolt positions to the centroid of the joint surface reduced lateral deflection of cap 101. The repositioning also reduced the relative motion between the cap bore surface and the bearing out surface, improving the fretting robustness of the design.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

I claim:
1. A connecting rod for an internal combustion engine, comprising:
 a first end;
 a second end including a thrust face, a non-thrust face parallel with the thrust face and positioned a spaced distance from the thrust face, a first planar surface including a first pair of bolt holes located therein, a second planar surface including a second pair of bolt holes located therein, and a centroid, the first planar surface and the second planar surface positioned perpendicular to the thrust face and the non-thrust face, the centroid being positioned along the first planar surface and the second planar surface transversely equidistant from a central axis of each of the first pair of bolt holes and from each of the second pair of bolt holes; and a shank connecting the first end to the second end, the shank including a centerline extending parallel to, and positioned an offset distance from, the centroid.

2. The connecting rod of claim 1, wherein the centroid is positioned between the shank centerline and the non-thrust face.

3. The connecting rod of claim 1, wherein the offset distance between the shank centerline and centroid is approximately 3.6 percent of the spaced distance.

4. The connecting rod of claim 1, wherein the offset distance is 2.7 millimeters.

5. The connecting rod of claim 1, wherein the first planar surface and the second planar surface are asymmetric about the shank centerline.

6. The connecting rod of claim 5, wherein the first planar surface and the second planar surface include a second end centerline positioned parallel to and offset from the shank centerline, and the first planar surface and the second planar surface are asymmetric about the second end centerline.

7. A connecting rod for an internal combustion engine, comprising:

a first end;
a second end including a thrust face, a non-thrust face parallel with the thrust face and positioned a spaced distance from the thrust face, a first planar surface including a first pair of bolt holes located therein, and a second planar surface including a second pair of bolt holes located therein, each bolt hole of the first and the second pairs of bolt holes including a central axis; and
a shank connecting the first end to the second end, the shank including a centerline;
wherein one bolt hole of each of the first and the second pairs of bolt holes is positioned a first hole distance from the shank centerline and another bolt hole of each of the first and the second pairs of bolt holes is positioned a second hole distance from the shank centerline, the first hole distance being greater than the second hole distance.

8. The connecting rod of claim 7, wherein the first hole distance extends from the shank centerline toward the non-thrust face.

* * * * *